United States Patent [19]
Oki et al.

[11] Patent Number: 6,162,759
[45] Date of Patent: Dec. 19, 2000

[54] METHOD FOR PRODUCING A CATALYST COMPONENT-CARRYING TITANIA FIBER

[75] Inventors: Yasuyuki Oki; Hironobu Koike; Yoshiaki Takeuchi, all of Niihama, Japan

[73] Assignee: Sumitomo Chemical Company, Ltd., Osaka, Japan

[21] Appl. No.: 09/250,183

[22] Filed: Feb. 16, 1999

[30] Foreign Application Priority Data

Feb. 13, 1998 [JP] Japan ................................. 10-031284
Nov. 25, 1998 [JP] Japan ................................. 10-333786

[51] Int. Cl.$^7$ ..................................... B01J 23/00
[52] U.S. Cl. ........................ 502/350; 502/351; 502/308; 502/309; 502/527.14; 502/439
[58] Field of Search ................... 502/350, 351, 502/308, 309, 527.14, 439

[56] References Cited

U.S. PATENT DOCUMENTS

| | | | |
|---|---|---|---|
| 4,166,147 | 8/1979 | Lange et al. | 428/328 |
| 4,176,089 | 11/1979 | Cull | 252/452 |
| 4,732,879 | 3/1988 | Kalinowski et al. | 502/5 |
| 4,975,256 | 12/1990 | Hegedus et al. | 423/239.1 |
| 5,137,855 | 8/1992 | Hegedus et al. | 502/84 |
| 5,139,982 | 8/1992 | Ayala et al. | 502/182 |
| 5,690,922 | 11/1997 | Mouri et al. | 424/76.1 |
| 5,872,072 | 2/1999 | Mouri et al. | 502/208 |
| 6,086,844 | 7/2000 | Koike et al. | 423/598 |

FOREIGN PATENT DOCUMENTS

| | | |
|---|---|---|
| 5-184923 | 7/1993 | Japan . |
| 6-134306 | 5/1994 | Japan . |

*Primary Examiner*—Mark L. Bell
*Assistant Examiner*—Patricia L. Hailey
*Attorney, Agent, or Firm*—Pillsbury Madison & Sutro LLP

[57] ABSTRACT

A method for producing a catalyst component-carrying titania fibers is provided, which has large specific surface area, large pore volume and a high catalyst activity. The method comprises steps of adding a catalyst component to the solution of a titanium alkoxide or to the hydrosis/polymerizatin reaction mixture and/or to the spinning solution, and treating a precursor fiber with water vapor before and/or during calcination.

14 Claims, No Drawings

METHOD FOR PRODUCING A CATALYST COMPONENT-CARRYING TITANIA FIBER

FIELD OF THE INVENTION

The present invention relates to a method for producing a catalyst component-carrying titania fiber. Specifically, the present invention relates to a method for producing a catalyst component-carrying titania fiber which can be used for reduction of nitrogen oxides, oxidation of organic compounds, decomposition of dioxin and decomposition for removal of chemicals such as organic solvents, agricultural chemicals and surfactants.

BACKGROUND OF THE INVENTION

Heretofore, many methods for producing a catalyst component-carrying titania fiber are known. For example, JP-A-5-184923 discloses that a vanadium oxide-carrying titania fiber is obtained by heat-treating an amorphous fiber to transform a crystal of an anatase-form titanium oxide and a crystal of a vanadium oxide. In this method, the amorphous fiber was produced by a sol-gel method of hydrolyzing an alkoxide in a solution of a titanium alkoxide and a vanadium compound or hydrolyzing alkoxides in a solution of a titanium alkoxide, the other alkoxide and a vanadium compound, followed by gelation.

JP-A-6-134306 discloses that a catalyst component-carrying titania fiber is obtained by forming a polymer containing titanium and silicon which is made from organic alkoxides of a titanium alkoxide and a silicon alkoxide by a sol-gel method, spinning to form a fiber, drying and calcining the fiber to obtain a titanium oxide-silica fiber, and carrying vanadium oxide and/or tungsten oxide.

However, the catalyst component-carrying titania fibers obtained by these methods have problems in that, since the specific surface area and the pore volume of the fibers are not so large, the catalyst activity of the fibers is not so high, resulting in low performances of the fibers, for example, in reduction of nitrogen oxides, oxidation of organic compounds, decomposition of dioxin or decomposition for removal of chemicals such as organic solvents, agricultural chemicals and surfactants in water.

SUMMARY AND OBJECTS OF THE INVENTION

The present inventors have devoted intensive efforts to obtain a catalyst component-carrying titania fibers having large specific surface area and large pore volume and having a high catalyst activity. As a result, the present inventors have developed a catalyst component-carrying titania fiber having such properties, by producing the fiber with a specific method. The present inventors have accomplished the foregoing and other objective by providing the specific method for a catalyst component-carrying titania fiber.

That is, the present invention provides a method for producing a catalyst component-carrying titania fiber which comprises steps of:

(i) adding water to a solution of a titanium alkoxide to carry out a hydrolysis reaction and a polymerization reaction of the titanium alkoxide to obtain a polymer in the reaction mixture;

(ii) dissolving the polymer in the presence of an organic solvent in which the polymer dissolves to obtain a spinning solution;

(iii) adding a catalyst component to the solution of a titanium alkoxide or to the reaction mixture in the step (i) and/or to the spinning solution in the step (ii);

(iv) spinning by using the spinning solution to obtain a precursor fiber;

(v) treating the precursor fiber with water vapor before and/or during calcination; and (vi) calcining the precursor fiber to obtain a catalyst component-carrying titania fiber.

DETAILED DESCRIPTION OF THE INVENTION

A method for producing a catalyst component-carrying titania fiber in the present invention comprises steps (i) to (vi).

A step (i) comprises adding water to a solution of a titanium alkoxide to carry out a hydrolysis reaction and a polymerization reaction of the titanium alkoxide to obtain a polymer in the reaction mixture.

A suitable titanium alkoxide for use in producing the catalyst component-carrying titania fiber in the present invention is preferably represented by the general formula [1]:

$$\text{Ti}(\text{OR}^1)_4 \qquad [1]$$

wherein $R^1$ represents an alkyl group having 1 to 4 carbon atoms and each of four $R^1$ in the formula [1] can be different from one another. Specific examples thereof include titanium tetramethoxide, titanium tetraethoxide, titanium tetra-n-propoxide, titanium tetra-iso-propoxide, titanium tetra-n-butoxide, titanium tetra-sec-butoxide, titanium tetra-tert-butoxide and the like. Among them, titanium tetra-iso-propoxide, whose $R^1$ in the general formula [1] is an isopropyl group, is preferable. In the case of those wherein the number of carbon atoms of $R^1$ in the general formula [1] exceeds 4, the content of the organic component in the resulting polymer increases and, therefore, the mechanical strength of the resulting fiber is liable to be reduced.

A solvent for preparing a solution of the titanium alkoxide is not restricted as long as the titanium alkoxide can be dissolved therein and, when a catalyst component is added to the solvent, the component can also be dissolved therein. Examples thereof include alcohols, ethers and aromatic hydrocarbons. The alcohol can be represented by the general formula [2]:

$$R^2\text{OH} \qquad [2]$$

wherein $R^2$ represents an alkyl group having 1 to 4 carbon atoms. Specific examples thereof include ethanol, isopropyl alcohol and the like. Specific examples of the ethers include tetrahydrofuran, diethylether and the like. Specific examples of the aromatic hydrocarbons include benzene and toluene.

An amount of the solvent to be used relative to the titanium alkoxide may be an amount where the alkoxide and water do not become an immiscible state in the hydrolysis reaction and is not specifically limited, and is preferably within the range from about 0.5 to 50 mole per 1 mole of the titanium alkoxide. Even if the amount is too large, no problem arises, but the cost required to condense the reaction mixture and to separate the solvent from the reaction mixture of the polymer in the post-treatment step becomes higher.

In the step (i) of the present invention, the hydrolysis reaction and the polymerization reaction of the titanium alkoxide are carried out by adding water to the solution of the titanium alkoxide.

The amount of water to be added may be usually in the range of about 1.5 to about 4 mole per 1 mole of the titanium alkoxide, but is not specifically limited. The water is not directly added normally, but preferably added in a form of solution prepared previously by diluting water with the same kind of solvent as that in which the titanium alokoxide is dissolved. A concentration of water in the solution, in which water is diluted, is preferably about 1 to about 50% by weight. When water or a water solution having a water concentration of more than about 50% by weight is directly added to the solution of the titanium alkoxide, the reaction partially might proceed in the reaction system and a polymer might be deposited which is insoluble in a spinning solution at the time of spinning in a post step.

The preparation of the titanium alkoxide solution is preferably conducted such that a titanium alkoxide is dissolved with a solvent and the resulting solution is refluxed under inert gas atmosphere like nitrogen gas atmosphere. The temperature when the water solution is added to the solution of the titanium alkoxide and when the hydrolysis reaction and the polymerization reaction of the titanium alkoxide are carried out is also not specifically limited, and may be within the range from 0° C. to a boiling point of the solvent in which titanium alkoxide are dissolved. When a fast reaction rate is desired, a higher reaction temperature is preferable.

By adding water to the titanium alkoxide solution, hydrolysis reaction and polymerization reaction of the titanium alkoxide are carried out to obtain a polymer in the reaction mixture. When the polymer is deposited in the mixture, it is preferred that the solvent is completely or partially removed from the mixture before preparing a spinning solution. When the polymer is not deposited in the mixture, the mixture in which the polymer is dissolved can be used as it is to prepare a spinning solution. From the industrial point of view, the higher concentration of the titanium alkoxide in the mixture is preferred. Therefore, a diluted solution of water with solvent is preferably added to the solution of the titanium alkoxide at a temperature of the boiling point of the solvent in which the titanium alkoxide is dissolved, and the reaction mixture is preferably refluxed while the solvent is discharged out of the reaction mixture in the same amount as that of the solvent which is added with water, to inhibit a decrease of concentration of titanium due to the addition of the solution of water.

The step (i) is followed by the step (ii) which comprise dissolving the polymer in the presence of an organic solvent in which the polymer dissolves to obtain a spinning solution.

The organic solvent which is used in the step (ii) is not limited as long as the polymer can be dissolved therein and, when a catalyst component is added to the organic solvent, the component can also be dissolved therein. Suitable organic solvents are alcohols such as ethanol and isopropyl alcohol, ethers such as tetrahydrofuran and diethylether and aromatic hydrocarbons such as benzene and toluene.

The amount of the organic solvent is not restricted as long as it is an amount where the polymer can be dissolved. The polymer concentration is preferably in the range of about 50 to about 80% by weight based on the resulting spinning solution. When the polymer concentration is lower than this range, the concentration may be adjusted by removing the organic solvent under heating and/or under reduced pressure to concentrate the solution to within the above preferable range. The spinning solution is obtained by way of adjusting the polymer concentration to within the preferable concentration range. When spinning is conducted, a viscosity of the spinning solution is preferably adjusted within the range from about 10 to about 2000 poise, and is more preferably from about 20 to about 1500 poise. This viscosity can be controlled by adjusting the concentration of the polymer and/or adjusting a temperature of the spinning solution.

In the present invention, a catalyst component is added to the solution of a titanium alkoxide or to the reaction mixture in the step (i) and/or to the spinning solution in the step (ii). The catalyst-component addition step is referred to as step (iii) in the present invention.

The kind of catalyst component is not restricted as long as it can be dissolved in the titanium alkoxide solution in the step (i) and the organic solvent used in the step (ii). The catalyst component may be a metallic compound which is made from at least one member selected from the group consisting of V, W, Al, As, Ni, Zr, Mo, Ru, Mg, Ca, Fe, Cr or Pt. Examples of the metallic compound include vanadium compounds such as vanadium alkoxide, vanadyl alkoxide, triethoxyvanadyl, vanadium acethylacetonate, vanadium chloride and vanadyl chloride, tungsten compounds such as tungsten alkoxide and tungsten chloride, aluminum compounds such as alkylaluminum and aluminum alkoxide, arsenic compounds such as arsenic chloride, nickel compounds such as nickel alkoxide and nickel chloride, zirconium compounds such as zirconium alkoxide, zirconium acethylacetonate, zirconium butoxyacethylacetonate, zirconium tetrabutoxide, molybdenum compounds such as molybdenum oxyacethylacetonate and molybdenum chloride, ruthenium compounds such as ruthenium chloride, magnesium compounds such as magnesium alkoxide, magnesium acethylacetonate and magnesium chloride, calcium compounds such as calcium alkoxide and calcium chloride, iron compounds such as iron alkoxide, iron acethylacetonate and iron chloride, chromium compounds such as chromium alkoxide and chromium acethylacetonate, and platinum compounds such as platinum acethylacetonate and platinum chloride. The preferred catalyst component may differ depending on the purpose of using the catalyst component-carrying titania fiber of the present invention. Not only one kind of catalyst component but also two or more kinds of components can be added at once. An optimum amount of the catalyst component to be added may A differ depending on the purpose of using the catalyst component-carrying titania fiber of the present invention and is not restricted. The amount is usually in the range of about 0.001 to about 50% by weight in terms of metal oxide of the metallic compound, based on the catalyst component-carrying titania fiber. When the amount is less than about 0.001% by weight, the catalytic activity tends to be insufficient. When the amount is larger than about 50% by weight, the catalytic activity tends to be saturated and it is unfavorable in view of the cost.

The timing when the catalyst component is added is not restricted as long as it is conducted in the step (i) and/or in the step (ii). The catalyst component may be added into the solution of a titanium alkoxide before adding water, may be added into the reaction mixture obtained by the hydrolysis reaction and the polymerization reaction after adding water into the solution of a titanium alkoxide, or may be added the spinning solution.

In the present invention, spinning is conducted in the step (iv) by using the spinning solution obtained by the procedures from step (i) to step (iii), and a precursor fiber is obtained.

Before the spinning, polymer concentration and viscosity in the spinning solution can be adjusted. The method of spinning is not limited and, for example, known spinning method such as nozzle extrusion spinning, centrifugal spinning, blow spinning, etc. can be applied. When spinning is conducted, the precursor fiber can also be stretched by using a rotating roller, a high-speed air current and the like.

It is preferable to select a proper spinning atmosphere and to adjust the temperature and the humidity of the blowing air in order to obtain a desired fiber.

The precursor fiber obtained by spinning is treated with water vapor before and/or during calcination in step (v).

The water vapor treatment can be carried out by using a known equipment such as a thermohygrostat and a kiln. The water vapor treatment is usually conducted at the temperature of about 70° C. to about 300° C., preferably about 85° C. to about 300° C., under an atmosphere having a water vapor partial pressure of about 0.3 atm or more, preferably 0.5 atm or more, for about 0.5 hour or more, preferably for about 1 hour or more, more preferably for about 5 hours or more. The higher the temperature and/or the water vapor partial pressure of the water vapor treatment is, the shorter the required treating time becomes. When the treating temperature is lower than about 70° C. or the water vapor partial pressure is lower than about 0.3 atm, a long-time treatment may be required.

When the water vapor treatment is carried out during calcination, the treatment may be conducted while the prescribed humidity is kept by blowing water vapor into a kiln or by spraying water, and while a rate of heating is adjusted. In a preferable method, the precursor fiber is kept at temperature of about 70° C. to about 300° C. under the water vapor partial pressure of about 0.3 atm or more for 0.5 hour or more. After the treatment, the water vapor partial pressure may be decreased and the calcination may be continued under the decreased water vapor pressure.

In the production of the catalyst-carrying titania fiber of the present invention, the precursor fiber obtained by spinning is calcined in the step (vi) after and/or while the precursor fiber is subjected to the water vapor treatment.

The method of calcination is not restricted and a known method may be conducted. While an optimum calcination temperature is also not restricted and may differ depending on the purpose of using the catalyst component-carrying titania fiber and depending on the condition of water vapor treatment, the temperature is usually in the range of about 300° C. to about 900° C. The higher the calcination temperature is, the more the porosity of the fiber tends to decrease, that is, the smaller the BET specific surface area and pore volume of the fiber tend to be. However, when the precursor fiber is subjected to a water vapor treatment at high temperature under an atmosphere of high water vapor partial pressure for a long time, the porosity can be maintained even if it is calcined at high temperature. When the calcination temperature is lower than about 300° C., the resulting fiber tends to contain an amorphous form and the catalyst activity of the fiber tends to be insufficient. On the other hand, when the calcination temperature is higher than about 900° C., the porosity of the fiber tends to decrease and the catalyst activity of the fiber tends to decrease. During the calcination, a tension may be applied to the precursor fiber and/or the calcined fiber.

As described above, a catalyst component-carrying titania fiber, which has high catalyst activity, can be obtained. In addition, when a catalyst component-carrying titania fiber having higher mechanical strength is required, a compound having active hydrogen and/or a silicon compound may be utilized. By using a compound having active hydrogen and/or a silicon compound, the catalyst component-carrying titania fiber having high mechanical strength can be obtained. The compound having active hydrogen is preferably used, since a catalyst component-carrying titania fiber having large pore volume, for example, a catalyst component-carrying titania fiber having a pore volume of 10 angstroms or larger can be obtained by using it and the fiber can show remarkably high catalyst activity when utilized in a reaction such as reduction of nitrogen oxides, oxidation of organic compounds and decomposition of dioxin and decomposition for removal of chemicals such as organic solvents, agricultural chemicals and surfactants.

When the compound having active hydrogen is used for producing the catalyst component-carrying fiber of titania of the present invention, the method of using the compound is not restricted. Examples of the method of using the compound having active hydrogen include a method of adding the compound into a solution of a titanium alkoxide and then hydrolysis and the polymerization reaction of the titanium alkoxide being conducted by adding water into the solution. By adding the compound having active hydrogen into the solution of a titanium alkoxide, the hydrolysis and the polymerization reaction of the titanium alkoxide can be controlled. This makes it possible to increase the solubility of the polymer which is obtained in the hydrolysis and the polymerization reaction mixture.

Preferable examples of the compound having active hydrogen include an alkyl salicylate and a β-diketone which is represented by the general formula [3]:

$$R^3COCH_2COR^4 \qquad [3]$$

wherein $R^3$ and $R^4$, independently of each other, represent an alkyl or alkoxy group having 1 to 4 carbon atoms.

Specific examples thereof include β-diketone such as ethyl acetoacetate, isopropyl acetoacetate, and alkyl salicylate such as ethyl salicylate, methyl salicylate. An amount of the compound having active hydrogen to be added is usually from about 0.05 to about 1.9 mole per 1 mole of the titanium alkoxide, and is preferably from about 0.1 to about 1 mole per 1 mole of the titanium alkoxide. When the amount of the compound having active hydrogen is smaller than about 0.05 mole per 1 mole of the titanium alkoxide, the effect of the compound having active hydrogen does not appear sufficiently. On the other hand, when the amount is larger than about 1.9 mole, it is liable that the hydrolysis reaction and the polymerization reaction are inhibited and, therefore, the polymerization does not proceed easily and the residual amount of the organic component in the resulting polymer tends to increase. As a result, the mechanical strength of the resulting fiber tends to be lowered.

When the silicon compound is used for producing the catalyst component-carrying fiber of titania of the present invention, the method of using the compound is not restricted. Examples of the method of using the silicon compound include a method of adding the silicon compound into a solution of a titanium alkoxide before adding water into the solution in the step (i), a method of adding the silicon compound into a hydrolysis and the polymerization reaction mixture obtained by adding water into a solution of a titanium alkoxide in the step (i) and a method of adding the silicon compound into a spinning solution in the step (ii).

The silicon compound is not limited as long as it can be uniformly mixed and dispersed in the solution of a titanium alkoxide, the organic solvent and the spinning solution. The silicon compound is preferably an alkyl silicate represented by the general formula [4]:

$$Si_nO_{n-1}(OR^5)_{2n+2} \qquad [4]$$

wherein $R^5$ represents an alkyl group having 1 to 4 carbon atoms, and n represents an integer of 1 or more. Each of $R^5$ in the formula [4] can be different from one another. A particularly preferable alkyl silicate is an ethyl silicate of the general formula [4] wherein R is an ethyl group and n is 4 to 6.

An amount of the silicon compound to be used is preferably equivalent to the amount wherein the silica content in the catalyst component-carrying titania fiber obtained after calcination is from about 1% to about 40% by weight, and is more preferably form about 5% to about 30% by weight, based on the fiber. When the silica content exceeds about 40% by weight based on the fiber, the mechanical strength of the resulting fiber may not be increased and the content of the catalyst component may be relatively decreased. Therefore, when the silica content exceeds about 40% by weight based on the fiber, the catalytic activity is liable to be deteriorated, unfavorably.

The catalyst component-carryinq titania fiber provided by the method of the present invention usually has a BET specific surface area of about 10 $m^2/g$ or more, preferably about 50 $m^2/g$ or more and more preferably about 100 $m^2/g$ or more. Also, the fiber usually has a pore volume of about 0.05 cc/g or more, preferably about 0.1 cc/g or more and more preferably about 0.15 cc/g or more, which is measured by a nitrogen absorption method. Furthermore, the fiber usually has a volume of pores having a pore diameter of not less than 10 angstroms being about 0.02 cc/g or more, preferably about 0.04 cc/g or more, more preferably about 0.1 cc/g or more.

In addition, the catalyst component-carrying titania fiber of the present invention usually has an average diameter per a monofilament of about 5 to about 50 $\mu$m and an average length per a monofilament of about 50 cm and more, and usually has an average tensile strength per a monofilament of about 0.1 GPa or more, preferably about 0.3 GPa or more.

The catalyst component-carrying titania fiber of the present invention can be used for reduction of nitrogen oxides, oxidation of organic compounds and decomposition for removal of chemicals such as nitrogen oxides, organic matters, organochlorine chemicals, e.g. dioxin, monochlorobenzene and the like, organic solvents, agricultural chemicals and surfactants. The decomposition of chemicals can be carried out by contacting the chemicals to be decomposed with the catalyst component-carrying titania fiber. Specifically, the decomposition of chemicals can be carried out by passing the chemicals through a reaction tube packed with the fiber. The temperature of the decomposition reaction is not restricted and it may differ depending on the kind and the concentration of the chemicals. The temperature is usually about 150° C. or more, preferably about 200° C. or more. The higher the temperature is, the higher the effect of decomposition for removal becomes.

The catalyst component-carrying titania fiber provided by the method of the present invention has a remarkably large specific surface area, a remarkably large pore volume and excellent catalyst activity and, therefore, the fiber can be used for reduction of nitrogen oxides, oxidation of organic compounds and decomposition for removal of chemicals such as nitrogen oxides, organic matters, organochlorine chemicals, e.g. dioxin, monochlorobenzene and the like, organic solvents, agricultural chemicals and surfactants. Accordingly, the industrial utilization value of the catalyst component-carrying titania fiber of the present invention is remarkably large, especially when it is used as the catalyst for the above reaction.

The method for producing the catalyst component-carrying titania fiber of the present invention is described in Japanese application nos. 10-031284, filed Feb. 13, 1998 and 10-333786, filed Nov. 25, 1998, the complete disclosures of which are incorporated herein by reference.

EXAMPLES

The present invention is described in more detail by following Examples, which should not be construed as a limitation upon the scope of the present invention.

In the Examples and Comparative Examples, the measurements of a BET specific surface area, a pore volume, an average tensile strength per a monofilament and nitrogen oxide removal efficiency were conducted in the following manners.

BET specific surface area ($m^2/g$): A catalyst component-carrying titania fiber was slightly ground in. a mortar, and then a BET specific surface area was measured by the continuous volume method with a nitrogen gas (a nitrogen absorption method), by using a gas adsorption/desorption analyser OMUNISOAP Model 360 (manufactured by COULTER Co.), after the vacuum treatment under the following condition.

Temperature: 130° C.

Period of time for vacuum: 6 hours

Degree of vacuum: $6 \times 10^{-5}$ Torr or less

Pore volume (cc/g): A catalyst component-carrying titania fiber was slightly ground in a mortar, and then a whole pore volume and a volume of pores having a pore diameter of not less than 10 angstroms were measured by the continuous volume method with a nitrogen gas (a nitrogen absorption method), by using a gas adsorption/desorption analyser OMUNISOAP Model 360 (manufactured by COULTER Co.), after the vacuum treatment under the same condition as the above measurement of BET specific surface area.

Average tensile strength (GPa): Using an automatic monofirament tensile tester (control section: Model AMF-C, tensile device section: TENSILON, Model UTM-2-20, manufactured by Toyo Boldwin Co., Ltd.), a tensile test of a monofilament of catalyst component-carrying titania was conducted under the conditions of a length of the monofilament of 25 mm and a stress rate of 1 mm/min. A strength at which the monofilament is broken was measured, and the average value of thirty measurements was taken as the average tensile strength per a monofilament of the fiber.

Nitrogen oxide removal efficiency (%): After weighing 0.5 g of a catalyst component-carrying titania fiber, the fiber was packed in a grass reaction tube having an inner diameter of 12 mm $\phi$ so that a packing height becomes 5 mm. A gas containing NO (100 ppm), $NH_3$ (100 ppm) and $O_2$ (10%) (200° C.) was passed through the reaction tube at a gas rate of 1 L/min, and then NO content in the gas which flowed into the tube and NO content in the gas which flowed out of the tube were measured by using an automatic $NO_X$ measuring instrument Model ECL-77A (manufactured by YANAGIMOTO MFG. CO., LTD.). A nitrogen oxide removal efficiency was calculated with the following formula.

Nitrogen oxide removal efficiency(%)=[(X−Y)/X]×100
X: NO content in the gas which flowed into the tube Y: NO content in the gas which flowed out of the tube

EXAMPLE 1

Titanium tetra-isopropoxide (1st grade reagent, manufactured by Wako Pure Pharmaceuticals Co., Ltd.) (300.0 g) and ethyl acetoacetate (extra pure reagent, manufactured by-Wako-Pure Pharmaceuticals Co., Ltd.) (55.0 g)were dissolved in isopropyl alcohol (extra pure reagent, manufactured by Wako Pure Pharmaceuticals Co., Ltd.) (73.6 g) and the solution was refluxed under a nitrogen atmosphere for 1 hour to prepare an alcohol solution of titanium tetra-isopropoxide. At this time, a molar ratio of ethyl acetoacetate to titanium tetra-isopropoxide is 0.40. Separately, pure water (36.0 g) was mixed with isopropyl alcohol (324.8 g) to prepare an alcohol solution having a water concentration of 10% by weight. A molar ratio of water in the solution to the titanium tetra-isopropoxide used is 1.9.

The alcohol solution of titanium tetra-isopropoxide was heated in a nitrogen atmosphere and refluxed under boiling and the alcohol solution of water was added into the solution of titanium tetra-isopropoxide with distilling the alcohol under stirring. A distillation rate of the alcohol was adjusted such that the alcohol-adding rate with water is almost the same as the alcohol-distilling rate. A period of time for adding the alcohol solution of water was adjusted to 103 min.

The deposition of a polymer started when an amount of added water was 1.8 mole per 1 mole of the utilized titanium tetra-isopropoxide. Once the total amount of water was added, the solution was in a slurry state.

After the slurry was refluxed for 1 hour, the alcohol in the slurry was distilled with heating and the slurry was concentrated until Ti concentration of the slurry reached about $3.46 \times 10^{-3}$ mol/g. The amount of water in the distilled alcohol was 0.14 mole per 1 mole of titanium tetra-isopropoxide utilized. Accordingly, a difference between the amount of water added and the amount of water discharged together with the alcohol out of the reaction system was 1.76 mole [=1.9–0.14] per 1 mole of titanium tetra-isopropoxide utilized.

Then, tetrahydrofuran (extra pure reagent, manufactured by Wako Pure Pharmaceuticals Co., Ltd.) (352 g) is added into the slurry, and the slurry was refluxed for 1 hour to dissolve the polymer and obtain a tetrahydrofuran solution of the polymer. Furthermore, triethoxyvanadyl (manufactured by High Purity Chemicals Co., Ltd.) (51.2 g) was added into the tetrahydrofuran solution of the polymer, and the solution was refluxed for further 1 hour. The said amount of triethoxyvanadyl added is equivalent to the amount wherein vanadium oxide ($V_2O_5$) content in the resulting catalyst component-carrying titania fiber obtained after spinning, a water vapor treatment and calcination is 21% by weight based on the fiber.

After the tetrahydrofuran solution of the polymer was filtered through a Teflon membrane filter having a pore diameter of 3 $\mu$m, the filtrate was concentrated by distilling isopropyl alcohol and tetrahydrofuran with heating to obtain 200 g of a spinning solution. A viscosity of the spinning solution was 50 poise at 40° C.

The spinning solution at 40° C. was extruded into an air atmosphere (40° C., relative humidity (RH): 60%) through a nozzle having a diameter of 50 $\mu$m with a nitrogen gas under a pressure of 20 kg/cm$^2$, followed by hauling off at a haul-off rate of 70 m/min to obtain a precursor fiber.

The resulting precursor fiber was put in a thermohygrostat (85° C., RH: 95%, water vapor partial pressure: 0.54 atm) and treated with water vapor for 15 hours. Then, the precursor fiber was heated at a heating rate of 200° C./hour and was calcined at 500° C. in air for 1 hour to obtain a catalyst component-carrying titania fiber having an average diameter of 15 $\mu$m per a monofilament.

Physical properties and nitrogen oxide removal efficiency of the catalyst component-carrying titania fiber are shown in Table 1.

EXAMPLE 2

According to the same manner as described in Example 1 except that ethyl silicate (brand name: ethyl silicate 40 manufactured by Tama Kagaku Kogyo Co, Ltd.) (37.2 g) was added into the tetrahydrofuran solution of polymer, which can be obtained after 352 g of tetrahydrofuran is added into the slurry of the polymer and the slurry is refluxed for 1 hour to dissolve the polymer, and the solution was refluxed for 1 hour, (before 51.2 g of triethoxyvanadyl was added to the solution,) a catalyst component-carrying titania fiber having an average diameter of 15 $\mu$m per a monofilament was obtained. The said amount of ethyl silicate added is equivalent to the amount wherein silica ($SiO_2$) content in the resulting catalyst component-carrying titania fiber obtained after spinning, a water vapor treatment and calcination is 12% by weight based on the fiber. In this Example 2, the amount of triethoxyvanadyl added is equivalent to the amount wherein vanadium oxide ($V_2O_5$) content in the resulting catalyst component-carrying titania fiber obtained after spinning, a water vapor treatment and calcination is 19% by weight based on the fiber.

Physical properties and nitrogen oxide removal efficiency of the obtained catalyst component-carrying titania fiber are shown in Table 1.

EXAMPLE 3

Titanium tetra-isopropoxide (1st grade reagent, manufactured by Wako Pure Pharmaceuticals Co., Ltd.) (300.0 g), triethoxyvanadyl (manufactured by High Purity Chemicals Co., Ltd.) (51.2 g) and ethyl acetoacetate (extra pure reagent, manufactured by Wako Pure Pharmaceuticals Co., Ltd.) (55.0 g) were dissolved in isopropyl alcohol (extra pure reagent, manufactured by Wako Pure Pharmaceuticals Co., Ltd.) (55. 4 g) and the solution was refluxed under a nitrogen atmosphere for 1 hour to prepare an alcohol solution of titanium tetra-isopropoxide. The said amount of triethoxyvanadyl added is equivalent to the amount wherein vanadium oxide ($V_2O_5$) content in the resulting catalyst component-carrying titania fiber obtained after spinning, a water vapor treatment and calcination is 19% by weight based on the fiber. And a molar ratio of ethyl acetoacetate to titanium tetra-isopropoxide is 0.40. Separately, pure water (37.9 g) was mixed with isopropyl alcohol (341.9 g) to prepare an alcohol solution having a water concentration of 10% by weight. A molar ratio of water in the solution to the titanium tetra-isopropoxide used is 2.0.

The alcohol solution of titanium tetra-isopropoxide was heated in a nitrogen atmosphere and refluxed under boiling and the alcohol solution of water was added into the solution of titanium tetra-isopropoxide with distilling the alcohol under stirring. A distillation rate of the alcohol was adjusted such that the alcohol-adding rate with water is almost the same as the alcohol-distilling rate. A period of time for adding the alcohol solution of water was adjusted to 108 min.

The deposition of a polymer started when an amount of added water was 1.8 mole per 1 mole of the utilized titanium tetra-isopropoxide. Once the total amount of water was added, the solution was in a slurry state.

After the slurry was refluxed for 1 hour, the alcohol in the slurry was distilled with heating and the slurry was concentrated until Ti concentration of the slurry reached about $3.46 \times 10^{-3}$ mol/g. The amount of water in the distilled alcohol was 0.07 mole per 1 mole of titanium tetra-isopropoxide utilized. Accordingly, a difference between the amount of water added and the amount of water discharged together with the alcohol out of the reaction system was 1.93[=2.0–0.07] mole per 1 mole of titanium tetra-isopropoxide utilized.

Then, tetrahydrofuran (extra pure reagent, manufactured by Wako Pure Pharmaceuticals Co., Ltd.) (352 g) is added into the slurry, and the slurry was refluxed for 1 hour to dissolve the polymer and obtain a tetrahydrofuran solution of the polymer. Furthermore, ethyl silicate (brand name: ethyl silicate 40 manufactured by Tama Kagaku Kogyo Co, Ltd.)(37.2 g) was added into the solution, and the solution was refluxed for further 1 hour. The said amount of ethyl silicate added is equivalent to the amount wherein silica ($SiO_2$) content in the resulting catalyst component-carrying titania fiber obtained after spinning, a water vapor treatment and calcination is 12% by weight based on the fiber.

After the tetrahydrofuran solution of the polymer was filtered through a Teflon membrane filter having a pore diameter of 3 μm, the filtrate was concentrated by distilling isopropyl alcohol and tetrahydrofuran with heating to obtain 200 g of a spinning solution. A viscosity of the spinning solution was 50 poise at 40° C.

The spinning solution at 40° C. was extruded into an air atmosphere (40° C., relative humidity (RH): 60%) through a nozzle having a diameter of 50 μm with a nitrogen gas under a pressure of 20 kg/cm$^2$, followed by hauling off at a haul-off rate of 70 m/min to obtain a precursor fiber.

The resulting precursor fiber was put in a thermohygrostat (85° C., RH: 95%, water vapor partial pressure: 0.54 atm) and treated with water vapor for 15 hours. Then, the precursor fiber was heated at a heating rate of 200° C./hour and was calcined at 500° C. in air for 1 hour to obtain a catalyst component-carrying titania fiber having an average diameter of 15 μm per a monofilament.

Physical properties and nitrogen oxide removal efficiency of the catalyst component-carrying titania fiber are shown in Table 1.

EXAMPLE 4

According to the same manner as described in Example 3 except that the amount of isopropyl alcohol used for dissolving titanium tetra-isopropoxide, triethoxyvanadyl and ethyl acetoacetate was changed from 55.4 g to 110.3 g and the amount of ethyl acetoacetate was changed from 55.0 g to 0 g, a catalyst component-carrying titania fiber was obtained.

Physical properties and nitrogen oxide removal efficiency of the catalyst component-carrying titania fiber are shown in Table 1.

COMPARATIVE EXAMPLE 1

According to the same manner as described in Example 1 except that the water vapor treatment was not conducted, a catalyst component-carrying titania fiber having an average diameter of 15 μm per a monofilament was obtained.

Physical properties and nitrogen oxide removal efficiency of the catalyst component-carrying titania fiber are shown in Table 1.

EXAMPLE 5

Titanium tetra-isopropoxide (1st grade reagent, manufactured by Wako Pure Pharmaceuticals Co., Ltd.) (300.0 g), vanadium isopropoxide (manufactured by Nichia Chemical Industries, Ltd.) (61.9 g) and ethyl acetoacetate (extra pure reagent, manufactured by Wako Pure Pharmaceuticals Co., Ltd.) (55.0 g) were dissolved in isopropyl alcohol (extra pure reagent, manufactured by Wako Pure Pharmaceuticals Co., Ltd.) (44.7 g) and the solution was refluxed under a nitrogen atmosphere for 1 hour to prepare an alcohol solution of titanium tetra-isopropoxide. The said amount of vanadium isopropoxide added is equivalent to the amount wherein vanadium oxide ($V_2O_5$) content in the resulting catalyst component-carrying titania fiber obtained after spinning, a water vapor treatment and calcination is 20% by weight based on the fiber. And a molar ratio of ethyl acetoacetate to titanium tetra-isopropoxide is 0.40. Separately, pure water (40.7 g) was mixed with isopropyl alcohol (367.6 g) to prepare an alcohol solution having a water concentration of 10% by weight. A molar ratio of water in the solution to the titanium tetra-isopropoxide used is 2.15.

The alcohol solution of titanium tetra-isopropoxide was heated in a nitrogen atmosphere and refluxed under boiling and the alcohol solution of water was added into the solution of titanium tetra-isopropoxide with distilling the alcohol under stirring. A distillation rate of the alcohol was adjusted such that the alcohol-adding rate with water is almost the same as the alcohol-distilling rate. A period of time for adding the alcohol solution of water was adjusted to 116 min.

The deposition of a polymer started when an amount of added water was 1.8 mole per 1 mole of the utilized titanium tetra-isopropoxide. Once the total amount of water was added, the solution was in a slurry state.

After the slurry was refluxed for 1 hour, the alcohol in the slurry was distilled with heating and the slurry was concentrated until Ti concentration of the slurry reached about $3.46 \times 10^{-3}$ mol/g.

Then, tetrahydrofuran (extra pure reagent, manufactured by Wako Pure Pharmaceuticals Co., Ltd.) (352 g) is added into the slurry, and the slurry was refluxed for 1 hour to dissolve the polymer and obtain a tetrahydrofuran solution of the polymer. Furthermore, ethyl silicate (brand name: ethyl silicate 40 manufactured by Tama Kagaku Kogyo Co, Ltd.) (23.4 g) was added into the solution, and the solution was refluxed for further 1 hour. The said amount of ethyl silicate added is equivalent to the amount wherein silica ($SiO_2$) content in the resulting catalyst component-carrying titania fiber obtained after spinning, a water vapor treatment and calcination is 8% by weight based on the fiber.

After the tetrahydrofuran solution of the polymer was filtered through a Teflon membrane filter having a pore diameter of 3 μm, the filtrate was concentrated by distilling isopropyl alcohol and tetrahydrofuran with heating to obtain 200 g of a spinning solution. A viscosity of the spinning solution was 50 poise at 40° C.

The spinning solution at 40° C. was extruded into an air atmosphere (40° C., relative humidity (RH): 60%) through a nozzle having a diameter of 50 μm with a nitrogen gas under a pressure of 20 kg/cm$^2$, followed by hauling off at a haul-off rate of 70 m/min to obtain a precursor fiber.

The resulting precursor fiber was put in a thermohygrostat (85° C., RH: 95%, water vapor partial pressure: 0.54 atm) and treated with water vapor for 15 hours. Then, the precursor fiber was heated at a heating rate of 200° C./hour and was calcined at 500° C. in air for 1 hour to obtain a catalyst component-carrying titania fiber having an average diameter of 15 μm per a monofilament.

The resulting catalyst component-carrying titania fiber had a BET specific surface area of 152 m$^2$/g, a whole pore volume of 0.16 cc/g, a volume of pores having a pore diameter of not less than 10 angstroms was 0.16 cc/g and an average tensile strength of 0.3 Gpa per a monofilament. A $SiO_2$ content in the fiber was 8% by weight and $V_2O_5$, content in the fiber was 20% by weight, based on the fiber, respectively.

By using the catalyst component-carrying titania fiber, catalyst performance test of the fiber as to decomposition of monochlorobenzene (hereinafter, referred to as MCB) was conducted as follows.

After weighing 6 g of the catalyst component-carrying titania fiber and 9 g of SiC (brand name: Shinanorandom manufactured by Shinano Electrorefining KK.), the fiber and the SiC were packed in a reaction glass tube having an inner diameter of 15 mm φ so that a packing height became 110 mm. After the reaction tube was heated at 300° C., a gas containing MCB (100 ppm), $CO_2$ (270 ppm), $O_2$ (15%) and nitrogen (300° C.) was passed through the reaction tube at a gas rate of 250 mL/min. The gas flowed into the tube and the gas flowed out of the tube were respectively passed through methylalcohol to absorb MCB, and then each of MCB content in the methylalcohol was measured by using a liquid chromatograph (Model: LC-6AD and SCL-6B, both manufactured by Shimadzu Corporation, a detection wavelength: 270 nm). A MCB decomposition efficiency was calculated with the following formula. As a result, a MCB decomposition efficiency was 100%.

MCB decomposition efficiency(%)=[(A−B)/A]×100

A: MCB content in the methylalcohol in which the gas flowed into the tube was absorbed B: MCB content in the methylalcohol in which the gas flowed out of the tube was absorbed

EXAMPLE 6

According to the same manner as described in Example 5, a catalyst component-carrying titania fiber was obtained. Then, catalyst performance test of the fiber as to decomposition of MCB was conducted according to the same manner as described in Example 5 except that the temperature of reaction tube and a gas containing MCB, $CO_2$, $O_2$ and nitrogen was changed from 300° C. to 200° C. As a result, a MCB decomposition efficiency was 100%.

TABLE 1

Physical properties and nitrogen oxide removal efficiency of the catalyst component-carrying titania fiber.

| | Physical properties | | | | | | Nitrogen oxide removal efficiency 200° C.) (%) |
|---|---|---|---|---|---|---|---|
| | BET specific surface area ($m^2/g$) | pore volume | | $SiO_2$ content (% by weight) | Tensile strength (GPa) | $V_2O_5$ content (% by weight) | |
| | | Volume I*1 (cc/g) | Volume II*2 (cc/g) | | | | |
| Example 1 | 65 | 0.18 | 0.18 | 0 | 0.2 | 21 | 99 |
| Example 2 | 169 | 0.20 | 0.20 | 12 | 0.3 | 19 | 97 |
| Example 3 | 173 | 0.15 | 0.15 | 12 | 0.3 | 19 | 93 |
| Example 4 | 138 | 0.12 | 0.04 | 12 | 0.4 | 19 | 84 |
| Comparative Example 1 | 15 | <0.01 | <0.01 | 0 | 0.1 | 21 | 19 |

*1. Volume I is a whole pore volume of the fiber.
*2. Volume II is a volume of pores having a pore diameter of not less than 10 angstroms.

What is claimed is:

1. A method for producing a catalyst component-carrying titania fiber which comprises:

(i) adding water to a solution of a titanium alkoxide to carry out a hydrolysis reaction and a polymerization reaction of the titanium alkoxide to obtain a polymer in the reaction mixture;

(ii) dissolving the polymer in the presence of an organic solvent in which the polymer dissolves to obtain a spinning solution;

(iii) adding a catalyst component to at least one member selected from the groups consisting of a solution of a titanium alkoxide, the reaction mixture in (i) and the spinning solution in (ii);

(iv) spinning the spinning solution to obtain a precursor fiber;

(v) treating the precursor fiber with water vapor before and/or during calcination; and (vi) calcining the precursor fiber to obtain a catalyst component-carrying titania fiber.

2. A method according to claim 1, wherein the catalyst component is made from at least one member selected from the group consisting of V, W, Al, As, Ni, Zr, Mo, Ru, Mg, Ca, Fe, Cr and Pt.

3. A method according to claim 1 or 2, wherein the precursor fiber is treated with water vapor under a water vapor partial pressure of 0.3 atm or more.

4. The method according to claim 3, wherein the precursor fiber is treated with water vapor for 0.5 hour or more.

5. The method according to claim 3, wherein a silicon compound is added into the solution of the titanium alkoxide before adding water into the solution in (i), into the hydrolysis and the polymerization reaction mixture obtained by adding water into the solution of a titanium alkoxide in (i) or into the spinning solution in (ii).

6. The method according to claim 5, wherein a silicon compound is added so that the silica content in the titania fiber obtained after calcination becomes 40% by weight or less based on the fiber.

7. The method according to claim 6, wherein a compound having active hydrogen is added.

8. The method according to claim 7, wherein the compound having active hydrogen is added into the solution of a titanium alkoxide in (i).

9. The method according to claim 7 or wherein the precursor fiber is treated with water vapor for 0.5 hour or more.

10. The method according to claim 1 or 2, wherein a silicon compound is added into the solution of the titanium alkoxide before adding water into the solution in (i), into the hydrolysis and the polymerization reaction mixture obtained by adding water into the solution of a titanium alkoxide in (i) or into the spinning solution in (ii).

11. The method according to claim 10, wherein the silicon compound is added so that the silica content in the titania fiber obtained after calcination becomes 40% by weight or less based on the fiber.

12. The method according to claim 1 or 2, wherein a compound having active hydrogen is added.

13. The method according to claim 12, wherein the compound having active hydrogen is added into the solution of a titanium alkoxide in (i).

14. The method according to claim 1, wherein (iv) the spinning is conducted by using the spinning solution in a condition where the polymer dissolves therein.

* * * * *